United States Patent [19]

Kennedy et al.

[11] 4,299,631
[45] Nov. 10, 1981

[54] SILICON CARBIDE BODIES AND THEIR PRODUCTION

[75] Inventors: Peter Kennedy, Preston; Bernard North, Chorley, both of England

[73] Assignee: United Kingdom Atomic Energy Authority, England

[21] Appl. No.: 142,999

[22] Filed: Apr. 23, 1980

[30] Foreign Application Priority Data

Apr. 24, 1979 [GB] United Kingdom ............... 14313/79
Apr. 24, 1979 [GB] United Kingdom ............... 14315/79

[51] Int. Cl.³ .............................................. C04B 35/56
[52] U.S. Cl. ..................................................... 501/91
[58] Field of Search ........................... 106/44; 423/345

[56] References Cited

U.S. PATENT DOCUMENTS

| | | | |
|---|---|---|---|
| 2,908,553 | 10/1959 | Frank ..................................... | 106/44 |
| 2,916,460 | 12/1959 | Van Der Beck, Jr. ................ | 106/44 |
| 3,236,780 | 2/1966 | Ozara ..................................... | 106/44 |
| 3,495,939 | 2/1970 | Forrest .................................. | 106/43 |
| 4,179,299 | 12/1979 | Coppola et al. ...................... | 106/44 |
| 4,205,363 | 5/1980 | Boos et al. ............................ | 106/44 |
| 4,224,073 | 9/1980 | Sasaki et al. ......................... | 106/44 |

Primary Examiner—O. R. Vertiz
Assistant Examiner—Mark Bell
Attorney, Agent, or Firm—Larson and Taylor

[57] ABSTRACT

A reaction bonded silicon carbide body in which there is included in the free silicon phase of the body to modify the electrical resistivity of the body, at least one of the Group III elements boron and indium or at least one of the Group V elements antimony and tantalum. The element may be added in compound form and may be included in the green body prior to reaction bonding or in the silicon with which it is reaction bonded.

8 Claims, 3 Drawing Figures

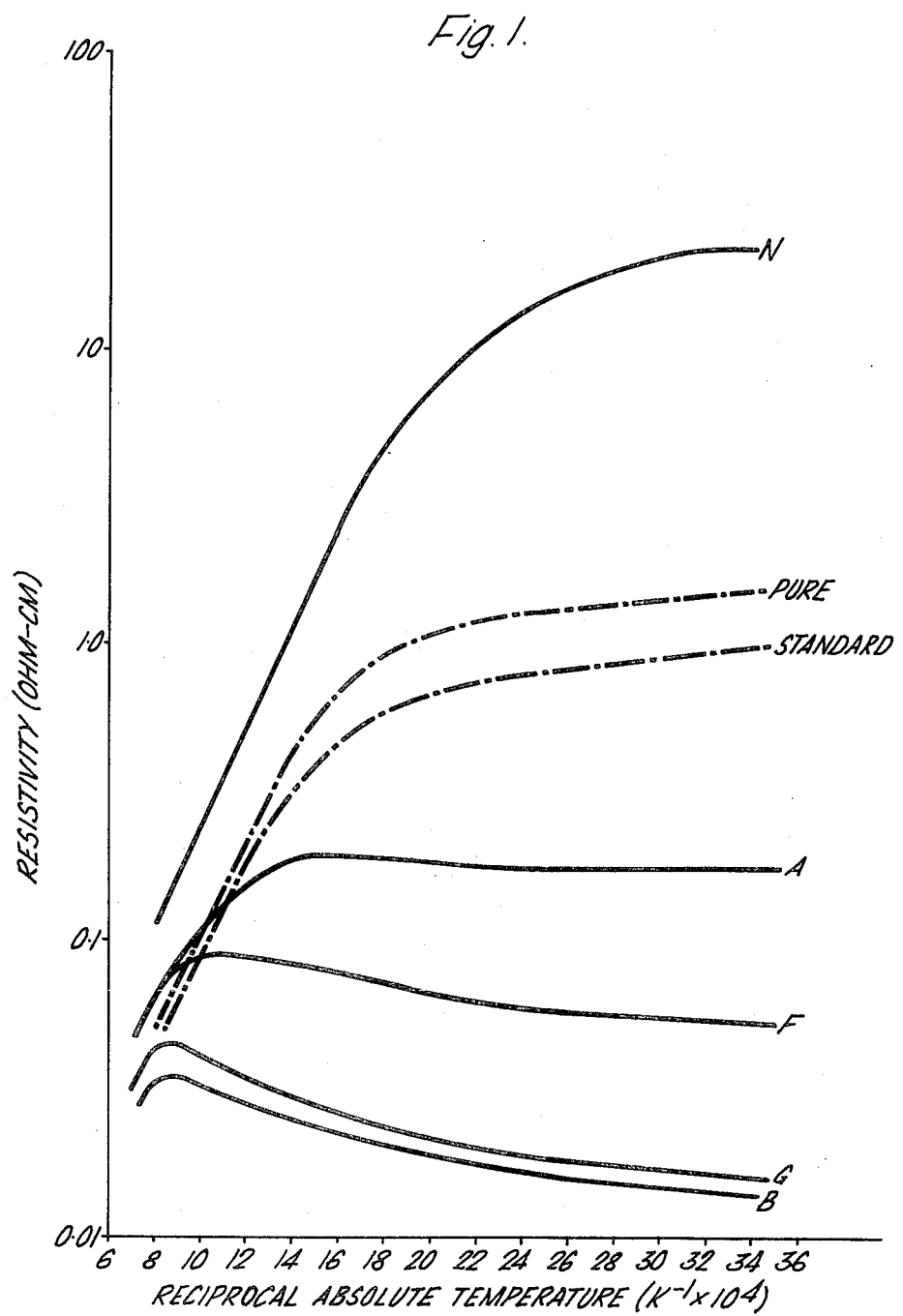

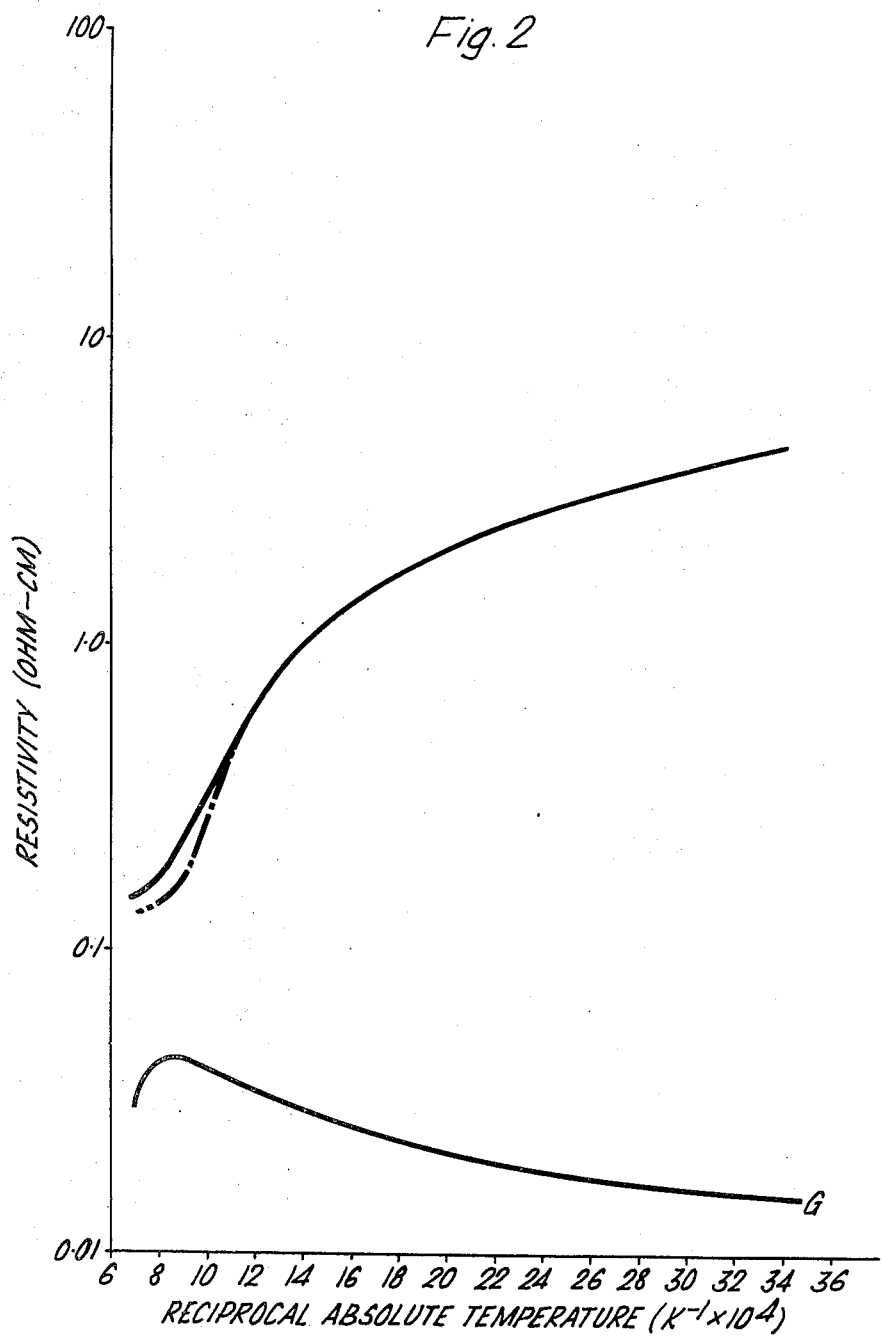

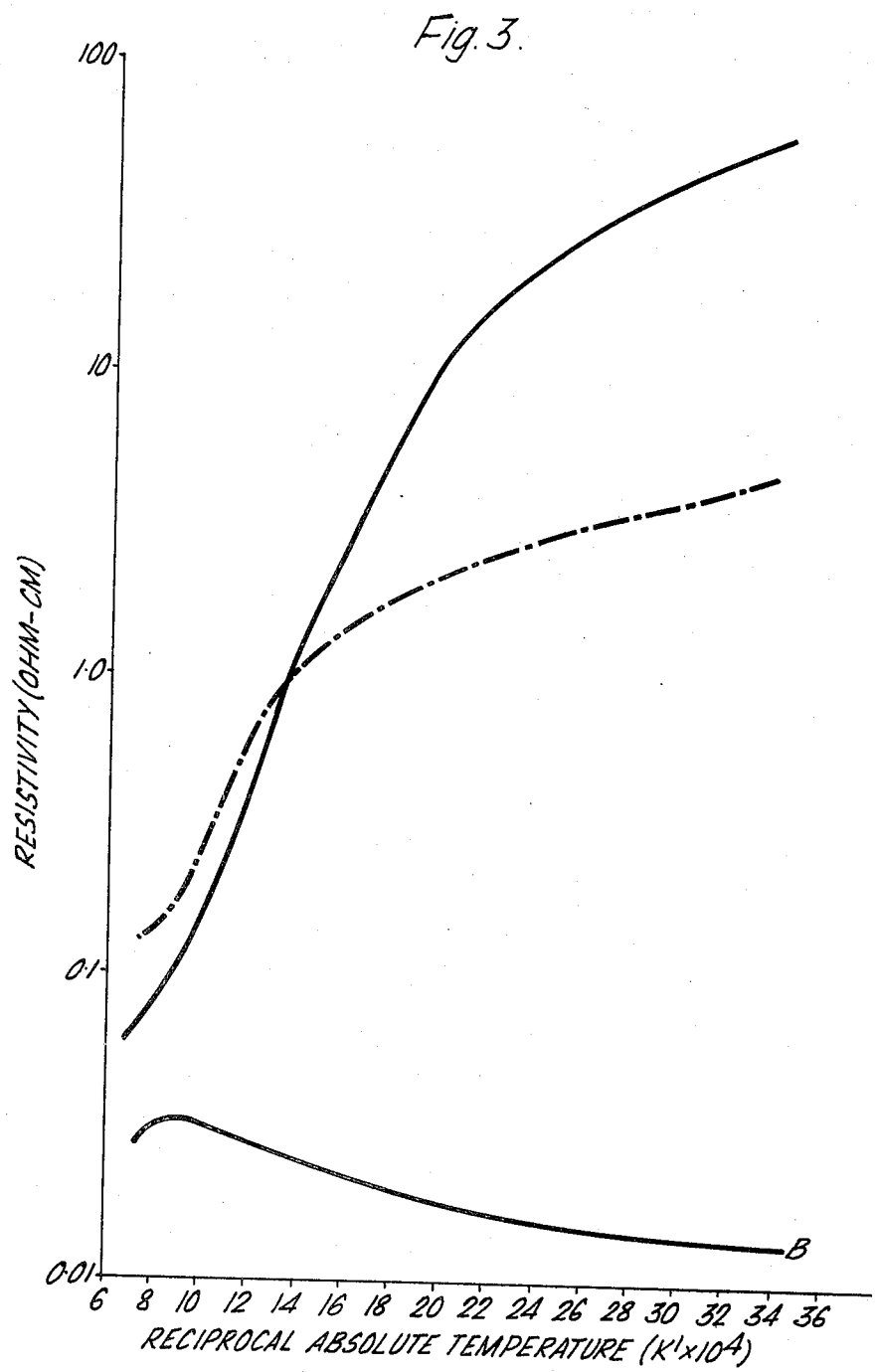

SILICON CARBIDE BODIES AND THEIR PRODUCTION

BACKGROUND OF THE INVENTION

This invention relates to silicon carbide bodies and their production. It is particularly concerned with silicon carbide bodies (hereinafter referred to as "reaction-bonded silicon carbide bodies") produced by the reaction sintering of green bodies, formed from a coherent mixture of silicon carbide and carbon, in the presence of molten silicon (hereinafter referred to as "siliconising"). The production of such bodies is described, for example, in U.S. Pat. No. 3,495,939. They consist essentially of a substantially continuous matrix of silicon carbide particles bonded together and a substantially continuous free silicon phase. Nitrogen is also present as a natural impurity in commercially available material.

Reaction-bonded silicon carbide has a number of uses in which its good oxidation resistance, its wear resistance and its mechanical properties at high temperature are of value. Variation in electrical conductivity and other physical properties, notably thermal conductivity, to meet specific requirements increases its use. Thus thermal shock resistance requires a high thermal conductivity and spark or electrochemical machining is facilitated by a high electrical conductivity while electric resistance heaters demand a minimum of change in resistivity with change in temperature.

SUMMARY OF THE INVENTION

The present invention consists in a reaction-bonded silicon carbide body in which the electrical resistivity of the body has been modified by the presence in the free silicon phase of at least one of the Group III elements boron and indium or at least one of the Group V elements antimony and tantalum.

The thermal conductivity of the body may be modified as well as the electrical conductivity.

It is known that the presence of other materials in silicon carbide bodies made by alternative methods which do not give rise to a free silicon phase may have an affect on their physical properties. It has been found however that the effect on reaction-bonded silicon carbide may not be the same and in certain cases the effect has even been reversed. The difference is considered to be due to the presence of the additive in the free silicon phase. Thus the addition of boron or indium has been found to reduce electrical resistivity at room temperature. The addition of antimony or tantalum on the other hand has been found to increase electrical resistivity. The effect of boron additions finds a particular application where a minimum of change in resistivity with change in temperature is desirable, for example in electric resistance heaters.

The element may be included as a compound containing the element or as the element itself. It may be introduced during the manufacture of a reaction-bonded silicon carbide body by adding it either to the silicon metal which infiltrates the coherent mixture of silicon carbide and carbon during sintering or including it in the mixture itself. The mixture may be shaped by any convenient conventional method such as extrusion, injection moulding, slip casting or pressing. The final form of the additive may be the same as the form in which it is initially added or result from chemical reaction during one or more stages in manufacture of the reaction sintered body. The modifications achieved vary, of course, with the free silicon content of the siliconised body and this in turn depends on the composition and density of the green body from which it is produced but, in general, additions to a green body of more than 1% by weight of a selected element does not appear to enhance any change in physical properties of the siliconised body.

An explanation of the effects of the elements may be based on their properties as Group III acceptor elements or Group V donor elements. Both silicon carbide and silicon are Group IV semi-conductors and some alteration may be expected in the properties of reaction-bonded silicon carbide as the result of adding to it elements of Group III and Group V because these additives will change charge carrier concentrations and introduce scattering centres in the lattice of the material. It is unexpected however that a predominating effect should be produced by the presence of an additive in the free silicon phase of reaction-bonded silicon carbide because of free silicon phase is a relatively minor one, yet this appears to be the case with these selected elements of the invention.

The following experiments illustrate the effects that may be achieved with these selected elements. Other elements in Groups III and V were found less effective.

Samples of reaction-bonded silicon carbide, both with and without additives were performed by slip-casting and then siliconised at 1640° C. for two hours under vacuum. Semi-conductor grade silicon and high purity $\alpha$-silicon carbide and carbon were used to minimise unintentional doping. After cooling the samples were abrasive blasted and appropriate size specimens cut for testing. Other samples were prepared from standard production silicon carbide grit and using $\beta$ rather than $\alpha$ silicon carbide, for comparison and to examine the effect of polytype on properties. To enable the separate contributions of the silicon carbide and free silicon phases to be assessed the free silicon was removed from some specimens by heating them at 1650° C.–1700° C. under vacuum for two hours in intimate contact with graphite felt followed by a leaching treatment in a mixture of nitric and hydrofluoric acids at 100° C. for 30 minutes.

Measurements of electrical resistivity were made using a Keithley model 503 milliohmmeter (4 probe Ac bridge method) on cylindrical specimens 50 mm long × 10 mm dia. Room temperature measurements were made with copper current carriers on to silvered specimen end faces and razor blade knife-edged voltage probes. Measurements up to 1110° C. were made in a tubular furnace using tungsten wirevoltage and current contacts. 5 mm diameter specimens were used where silicon removal was carried out.

The results of the experiments are shown in the accompanying graphs (FIGS. 1 to 3) and in the Tables below.

FIG. 1 indicates the effect observed with certain additives compared with the electrical resistivity of reaction-bonded silicon carbide bodies prepared without additives from pure alpha silicon carbide powder (marked PURE on the graph) and standard production silicon carbide powder (marked STANDARD on the graph). The letters marked against the other curves on the graph correspond to the letters in Table I below.

FIGS. 2 and 3 indicate the effect of removal of silicon from two samples, respectively those in which 1% boron and 1% boron carbide is added to the slip during preparation of the samples. In each graph the lowest curve is a reproduction of the curve for the same material in FIG. 1, the uppermost curve is the curve for the material with the silicon removed and the middle curve included for comparison and partially overlaid in FIG. 2, is the curve for reaction-bonded silicon carbide prepared from semi-conductor grade alpha silicon carbide powder (see curve marked PURE in FIG. 1) but with the free silicon removed. From the substantial identity of the curves for desiliconised material with and without the addition of elemental boron it appears that, if the additive is elemental boron, it is only present in the free silicon phase after siliconising whereas if boron carbide is the additive some of the boron also substitutes in the silicon carbide lattice.

In the following tables Table I gives the result of experiments with additives (some of which are shown in the graphs) and Table II the results without additives for comparison. The results given are the mean of six measurements for thermal conductivity and of five measurements for electrical resistivity. In Table I the figures for amount added are weight percentages based on the total solids content of the slip and refer to the weight of element added to the slip or, in the case of additions to silicon, the weight on an equivalent basis which it was calculated should be introduced by the expected gain in silicon content of the green body during siliconising. The actual weight present in the siliconised product may, as indicated, be considerably less than the amount added, due to losses during siliconising.

The lower result for thermal conductivity of material prepared from $\beta$ silicon carbide powder without an additive can be explained by its finer grain structure.

We claim:

1. A silicon carbide body consisting essentially of a reaction-bonded silicon carbide body having a free silicon phase and in said free silicon phase at least one of the Group III elements boron and indium or at least one of the Group V elements antimony and tantalum in an amount sufficient to modify the electrical resistivity of the body.

2. A reaction-bonded silicon carbide body as claimed in claim 1 wherein the Group III element is boron and the electrical resistivity is below 0.1 ohm cm.

3. A reaction-bonded silicon carbide body as claimed in claim 2 wherein the electrical resistivity is below 0.015 ohm cm.

4. In a process for the production of a reaction-bonded silicon carbide body of the type wherein a coherent mixture of silicon carbide and carbon is formed into a green body and the green body is reaction-sintered in the presence of molten silicon, the improvement comprising adding to said coherent mixture or said molten silicon an element selected from the group consisting of at least one of the Group III elements boron and indium or at least one of the Group V elements antimony and tantalum so as to introduce said element into the free silicon phase of the body, said element being added in an amount sufficient to modify the electrical resistivity of the reaction-bonded silicon carbide body.

5. A process as claimed in claim 4 wherein the element is introduced by including it in a coherent mixture of silicon carbide and carbon, forming the mixture into a green body and siliconising the green body.

6. A process as claimed in claim 5 wherein the element is boron and is added as boron carbide.

7. A process as claimed in claim 5 wherein the element is added in an amount not greater than 1 percent by weight of the coherent mixture.

8. A process as claimed in claim 4 wherein the element is introduced by including it in the molten silicon.

TABLE I

|   | Additive | Added to | Amount added | Measured Content (weight %) | Mean Value ohm cm | Standard Deviation | Thermal Conductivity W/mK |
|---|---|---|---|---|---|---|---|
| A | Boron Carbide | Slip | 0.1 | 0.02 | 0.0975 | 0.0091 | 155 |
| B | " | " | 1.0 | 0.08 | 0.0105 | 0.0040 | 117 |
| C | " | " | 2.0 | | 0.0129 | 0.0016 | 122 |
| D | " | " | 2.0* | | 0.034 | 0.0029 | 141 |
| E | " | " | 2.9 | | 0.0147 | 0.0016 | 124 |
| F | Boron | " | 0.1 | 0.03 | 0.0453 | 0.0065 | 153 |
| G | " | " | 1.0 | 0.16 | 0.0119 | 0.0008 | 126 |
| H | " | " | 1.0$^\phi$ | | 0.0248 | | 129 |
| J | " | Silicon | 0.1 | 0.07 | 0.0178 | 0.0047 | 156 |
| K | " | " | 1.0 | 0.32 | 0.0270 | 0.0047 | 152 |
| L | Antimony | Slip | 1.0 | <0.005 | 2.07 | 0.97 | 173 |
| M | " | Silicon | 0.1 | <0.005 | 1.80 | 0.63 | 150 |
| N | " | " | 1.0 | <0.005 | 12.26 | 8.25 | 162 |
| P | Indium | Slip | 0.1 | <0.05 | 1.354 | 0.80 | 146 |
| Q | " | " | 1.0 | <0.05 | 0.254 | 0.035 | 136 |
| R | " | Silicon | 1.0 | <0.05 | 0.541 | 0.092 | 146 |
| S | Tantalum | Slip | 1.0 | | 0.45 | 5.74 | 2.45 | 151 |

*using beta silicon carbide instead of alpha silicon carbide
$^\phi$using standard production silicon instead of semi-conductor pure material

TABLE

| Using | Thermal Conductivity W/mK | Electrical Resistivity Ohm 16cm |
|---|---|---|
| αSilicon carbide powder from standard commercial production | 165 | 1.81 |
| Pure α silicon carbide powder | 161 | 1.27 |
| Pure β silicon carbide powder | 131 | 1.85 |

* * * * *